(12) United States Patent
Imazu et al.

(10) Patent No.: US 9,623,767 B2
(45) Date of Patent: Apr. 18, 2017

(54) TORQUE CONTROL APPARATUS AND CONTACTLESS CHARGING SYSTEM

(75) Inventors: Tomoya Imazu, Yokohama (JP); Hiroshi Tanaka, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/112,804

(22) PCT Filed: Feb. 8, 2012

(86) PCT No.: PCT/JP2012/052803
§ 371 (c)(1),
(2), (4) Date: Oct. 18, 2013

(87) PCT Pub. No.: WO2012/144253
PCT Pub. Date: Oct. 26, 2012

(65) Prior Publication Data
US 2014/0039728 A1    Feb. 6, 2014

(30) Foreign Application Priority Data
Apr. 21, 2011    (JP) .................................. 2011-095331

(51) Int. Cl.
*B60L 15/40*    (2006.01)
*B60L 11/18*    (2006.01)
(Continued)

(52) U.S. Cl.
CPC ............. *B60L 15/40* (2013.01); *B60L 11/182* (2013.01); *B60L 11/1803* (2013.01);
(Continued)

(58) Field of Classification Search
CPC  B60L 11/182; B60L 11/1809; B60L 11/1827; B60L 11/1829; B60L 11/1833;
(Continued)

(56) References Cited

U.S. PATENT DOCUMENTS 5,821,731 A * 10/1998 Kuki et al. .................... 320/108
5,850,135 A    12/1998 Kuki et al.
(Continued)

FOREIGN PATENT DOCUMENTS

CN    1322998 C    6/2007
CN    101182808 A    5/2008
(Continued)

*Primary Examiner* — Calvin Cheung
*Assistant Examiner* — Thomas Ingram
(74) *Attorney, Agent, or Firm* — Foley & Lardner LLP

(57) ABSTRACT

A torque control apparatus is provided which facilitates a positioning between a position of the vehicle and a predetermined parking position when the vehicle is parked. The torque control apparatus according to the present invention includes: accelerator opening angle detecting means for detecting an accelerator opening angle; torque setting means for setting a torque to drive the vehicle (100) on a basis of an accelerator opening angle detected by the accelerator opening angle detecting means; and torque control means for correcting the torque set by the torque setting means in accordance with the relative position between the predetermined parking position and the position of vehicle (100), and driving the vehicle (100) according to the corrected torque.

10 Claims, 9 Drawing Sheets

(51) Int. Cl.
*B60W 30/06* (2006.01)
*H01M 10/46* (2006.01)
*H02J 7/02* (2016.01)
*B60L 15/20* (2006.01)
*H02J 5/00* (2016.01)

(52) U.S. Cl.
CPC ....... *B60L 11/1809* (2013.01); *B60L 11/1824* (2013.01); *B60L 11/1827* (2013.01); *B60L 11/1829* (2013.01); *B60L 11/1833* (2013.01); *B60L 11/1835* (2013.01); *B60L 11/1846* (2013.01); *B60L 15/20* (2013.01); *H01M 10/46* (2013.01); *B60L 2210/10* (2013.01); *B60L 2210/30* (2013.01); *B60L 2210/40* (2013.01); *B60L 2240/12* (2013.01); *B60L 2240/32* (2013.01); *B60L 2240/421* (2013.01); *B60L 2240/423* (2013.01); *B60L 2250/26* (2013.01); *B60W 30/06* (2013.01); *H01M 2220/20* (2013.01); *H02J 5/005* (2013.01); *H02J 7/025* (2013.01); *Y02T 10/645* (2013.01); *Y02T 10/7005* (2013.01); *Y02T 10/7072* (2013.01); *Y02T 10/7216* (2013.01); *Y02T 10/7241* (2013.01); *Y02T 10/7275* (2013.01); *Y02T 90/10* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .... B60L 11/1835; Y02T 90/10; Y02T 90/122; Y02T 90/125; B60W 30/06
USPC .................. 701/22, 300; 320/109; 340/932.2
See application file for complete search history.

(56) References Cited

U.S. PATENT DOCUMENTS

| | | | |
|---|---|---|---|
| 8,352,146 B2 | 1/2013 | Doering | |
| 8,483,899 B2* | 7/2013 | Martin | 701/22 |
| 2002/0069007 A1* | 6/2002 | Bidner et al. | 701/93 |
| 2005/0137766 A1* | 6/2005 | Miyakoshi | B60T 7/22 |
| | | | 701/36 |
| 2005/0236201 A1* | 10/2005 | Spannheimer | B62D 15/0285 |
| | | | 180/204 |
| 2007/0131505 A1* | 6/2007 | Kim | 191/14 |
| 2008/0114521 A1 | 5/2008 | Doering | |
| 2009/0091475 A1* | 4/2009 | Watanabe | B60Q 9/005 |
| | | | 340/932.2 |
| 2010/0106372 A1* | 4/2010 | Watanabe et al. | 701/41 |
| 2010/0161216 A1* | 6/2010 | Yamamoto | 701/207 |
| 2011/0050164 A1* | 3/2011 | Partovi et al. | 320/108 |
| 2011/0082612 A1 | 4/2011 | Ichikawa | |
| 2011/0254503 A1* | 10/2011 | Widmer et al. | 320/108 |
| 2012/0098483 A1* | 4/2012 | Patel | 320/108 |
| 2012/0206098 A1* | 8/2012 | Kim | 320/108 |
| 2012/0253624 A1* | 10/2012 | Maruyama | F02D 11/02 |
| | | | 701/70 |

FOREIGN PATENT DOCUMENTS

| | | |
|---|---|---|
| JP | 9-215211 A | 8/1997 |
| JP | 9-242579 A | 9/1997 |
| JP | 10-272913 A | 10/1998 |
| JP | 2005-057962 A | 3/2005 |
| JP | 2005178626 A | 7/2005 |
| JP | 2008-288889 A | 11/2008 |
| JP | 2010-144667 A | 7/2010 |
| JP | 2010-183813 A | 8/2010 |
| JP | 2010-246348 A | 10/2010 |
| JP | 2011-035953 A | 2/2011 |

\* cited by examiner

TORQUE CONTROL APPARATUS AND CONTACTLESS CHARGING SYSTEM

TECHNICAL FIELD

The present invention relates to a torque control apparatus and a contactless charging system.

BACKGROUND ART

In a contactless power supply apparatus having a power transmitting coil and a power receiving coil, these coils being mutually opposed to each other via a gap formed with a predetermined distance, having their predetermined diameters and shapes, and taking the same structures symmetrically with respect to upward and downward directions during a power supply, an electric automotive vehicle which is a power receiving side includes a charging purpose controller and a battery, the battery being charged according to a power supply from the power transmitting coil to the power receiving coil as disclosed in a Patent Document 1.

However, there is a problem such that, when the vehicle is parked to a parking space for the charging purpose, it is difficult to perform a positioning between the power receiving coil at a vehicle side and the power transmitting coil at an earth side.

A task to be solved by the present invention is to provide a torque control apparatus which facilitates the positioning between a position of the vehicle and a predetermined parking position, when the vehicle is parked.

PRE-PUBLISHED DOCUMENT

Patent Document 1: Japanese Patent Application First Publication No. 2008-288889.

DISCLOSURE OF THE INVENTION

Task to be Solved by the Invention

The above-described task can be solved by correcting a torque in accordance with a relative position between the predetermined parking position and the position of the vehicle and the vehicle is driven according to the corrected torque.

According to the present invention, when the vehicle approaches the predetermined parking position, the torque is corrected. Thus, a fine movement of the vehicle according to a driving operation can be facilitated so that, as a result of this, the positioning between the predetermined parking position and the position of the vehicle can be facilitated.

EMBODIMENTS FOR CARRYING OUT THE INVENTION

Hereinafter, preferred embodiments according to the present invention will be explained on a basis of drawings.

Figure 1:
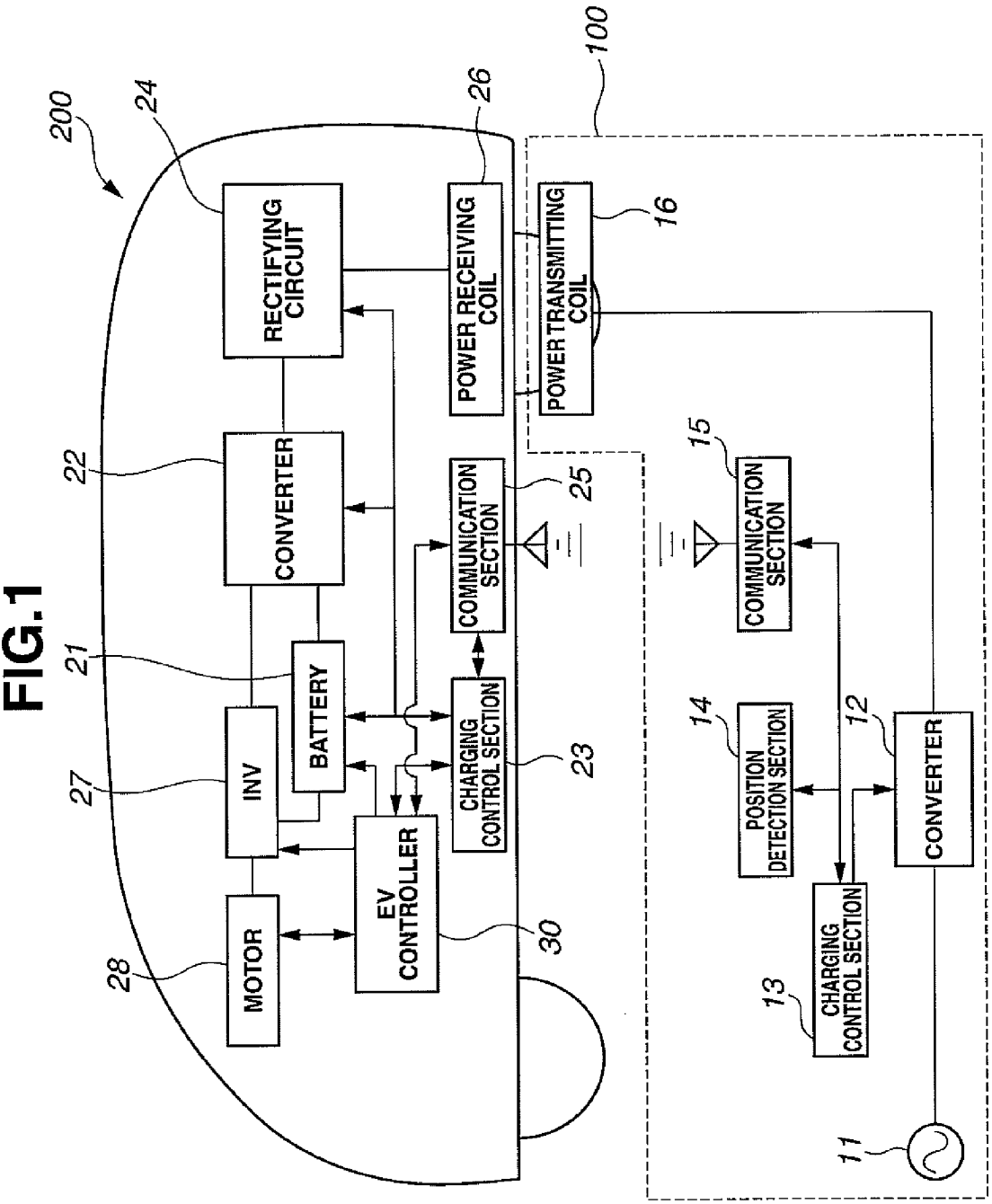
FIG. 1 is a block diagram of a contactless charging system related to a preferred embodiment according to the present invention.

FIG. 1 is a block diagram of a vehicle including a torque control apparatus in a preferred embodiment according to the present invention and a contactless charging system having a charging apparatus 100. It should be noted that the torque control apparatus in this embodiment is mounted in an electric automotive vehicle but may be mounted in a vehicle such as a hybrid vehicle or so forth.

As shown in FIG. 1, the contactless charging system in this embodiment includes: a vehicle 200 as a unit of a vehicle side; and a charging apparatus 100 which serves as an earth side unit. The contactless charging system is a system in which an electric power is supplied in a contactless manner from a charging apparatus 100 installed in a power supply station or so forth to charge a battery 21 which is installed in a vehicle 200.

Charging apparatus 100 includes: an alternating current power supply 11; a converter 12; a charging control section 13; a position detection section 14; a communication section 15; and a power transmitting coil 16. Charging apparatus 100 is installed in a parking space to park vehicle 200 and is a unit on the earth side to supply an electric power between the coils in a contactless manner when vehicle 200 is parked at a predetermined parking position.

Converter 12 is an electric power converting device to convert an alternating current electric power supplied from alternating current power supply 11 into an alternating current of a high frequency to supply an electric power to power transmitting coil 16. Communication section 15 performs a wireless communication with a communication section 25 at vehicle side 200 to perform information transmission or reception. Communication section 15 transmits a signal to the effect that, for example, an electric power supply from charging apparatus 100 is started to communication section 25 or receives the signal from communication section 25 to the effect that, from vehicle 200 side, the electric power is received from charging apparatus 100. Position detection section 14 periodically detects a position of power receiving coil 26 of vehicle 200 to be parked at the predetermined parking position. Position detection section 14, for example, transmits the signal of an infra-red ray signal or a supersonic wave signal and detects the position according to a variation of the signal.

Charging control section 13 controls charging apparatus 100 by controlling converter 12, position detector 14, and communication section 15 to control charging apparatus 100. Charging control section 13 controls converter 12 to control the electric power outputted from power transmitting coil 16 to power receiving coil 26. Charging control section 13 transmits the control signal related to the charging from communication section 15 to communication section 25, and controls position detection section 14 to detect a relative position of power receiving coil 26 to power transmitting coil 16.

Power transmitting coil 16 is installed in the parking space having the contactless charging system in this embodiment. When vehicle 200 having the unit of vehicle 200 side in the contactless charging system is parked at a predetermined parking position, power transmitting coil 16 is located at a lower part of power receiving coil 26 and is positioned with a distance to power receiving coil 26 maintained. Power transmitting coil 16 is a circular shaped coil parallel to a surface of the parking space.

Vehicle 200 includes: a battery 21; a converter 22; a charging control section 23; a rectifying circuit 24; a communication section 25; a power receiving coil 26; an inverter 27; a motor 28; and an EV controller 30. Power receiving coil 26 is disposed between rear road wheels with a bottom surface (chassis) of vehicle 200. Then, when vehicle 200 is parked at the predetermined parking position, power receiving coil 26 is positioned at an upper part of power transmitting coil 16 and is positioned with a distance to power transmitting coil 16 maintained. Power receiving coil 26 is a coil having a circular shape parallel to the surface of the parking space. Rectifying circuit 24 rectifies an alternating current electric power received by power receiving coil 26 into a direct current electric power. Converter 22 is a DC-DC converter to convert the direct current electric power rectified by rectifying circuit 26 into the direct current suitable for the charging of battery 21. In addition, converter 22 includes: battery 21; converter 22 which provides a charging circuit; a junction box (not shown) having a switch to electrically separate rectifying circuit 24 and power receiving coil 26. The junction box is controlled by means of charging control section 23.

Battery 21 is constituted by a connection of a plurality of secondary cells and provides an electric power supply source for vehicle 200. Inverter 27 is a control circuit to convert the direct current electric power outputted from battery 21 into the alternating current electric power and to supply the electric power to a motor 28. Motor 28 is constituted by, for example, a three-phase alternating current electric motor and provides a drive source to drive vehicle 200.

Communication section 25 performs the wireless communication with communication section 15 on the earth side to perform the information transmission or reception. Charging control section 23 controls battery 21, converter 22, rectifying circuit 24, and communication section 25 during the charging. In addition, charging control section 23 is connected to an EV controller 30 via a CAN communication network and performs a transmission or reception of information signals. Charging control section 23 performs the transmission or reception of the control signals related to the charging to charging control section 13 via communication section 15 and communication section 25 to control the contactless charging system in this embodiment. Charging control section 23 controls, while the charging is carried out, the junction box included in converter 22 such that a conduction is carried out from power receiving coil 26 to battery 21 via rectifying circuit 24 and converter 22. Thus, the electric power transmitted from power transmitting coil 16 is supplied to battery 21 to charge battery 21. EV controller 30 is a control section to control the whole of vehicle sets the torque to drive vehicle 200, and transmits a signal to start the charging to charging control section 23.

Figure 2A:
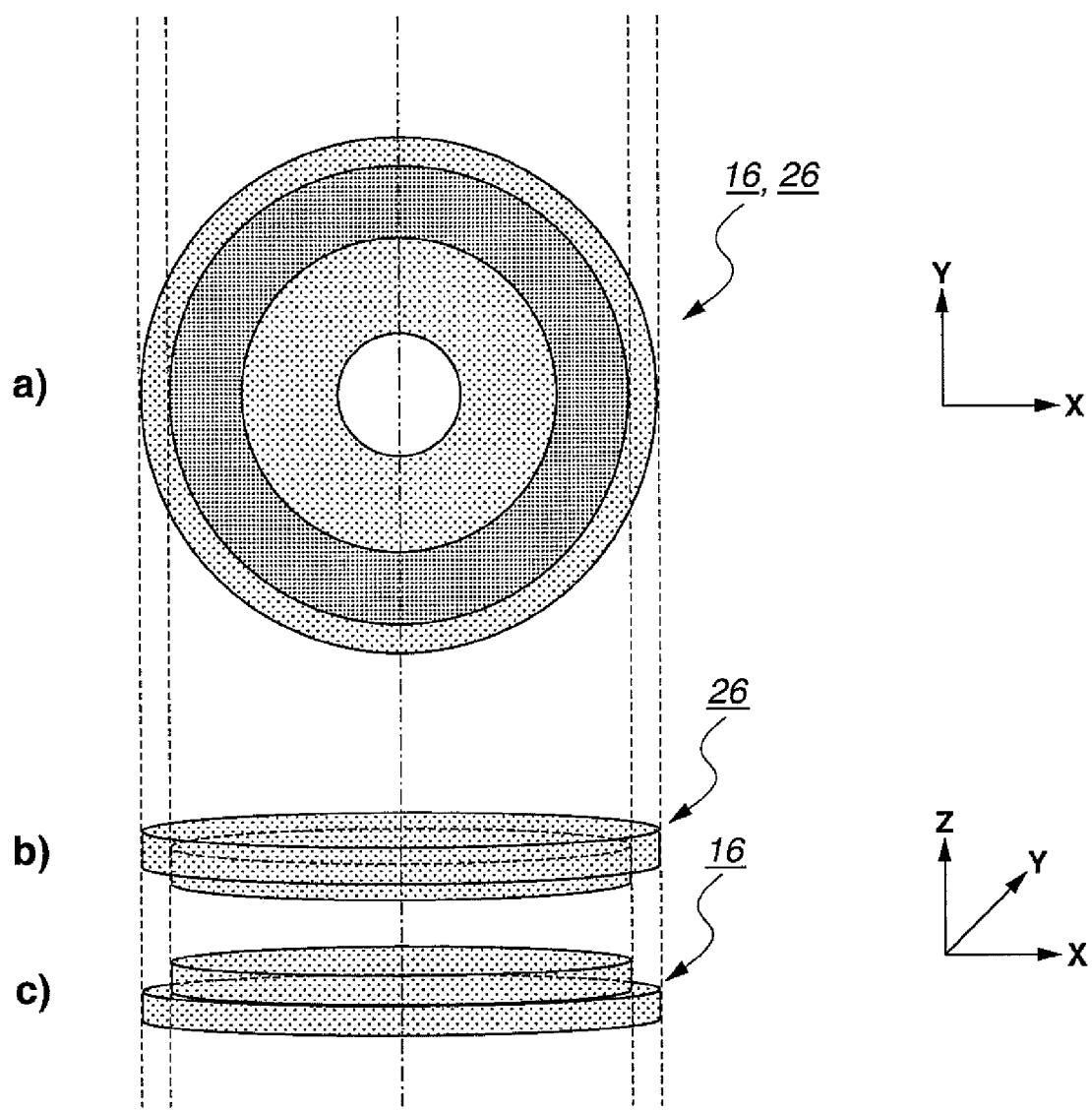
FIG. 2a is a plan view and a perspective view, each view representing that primary and secondary windings shown in FIG. 1 are opposed to each other.
Figure 2B:
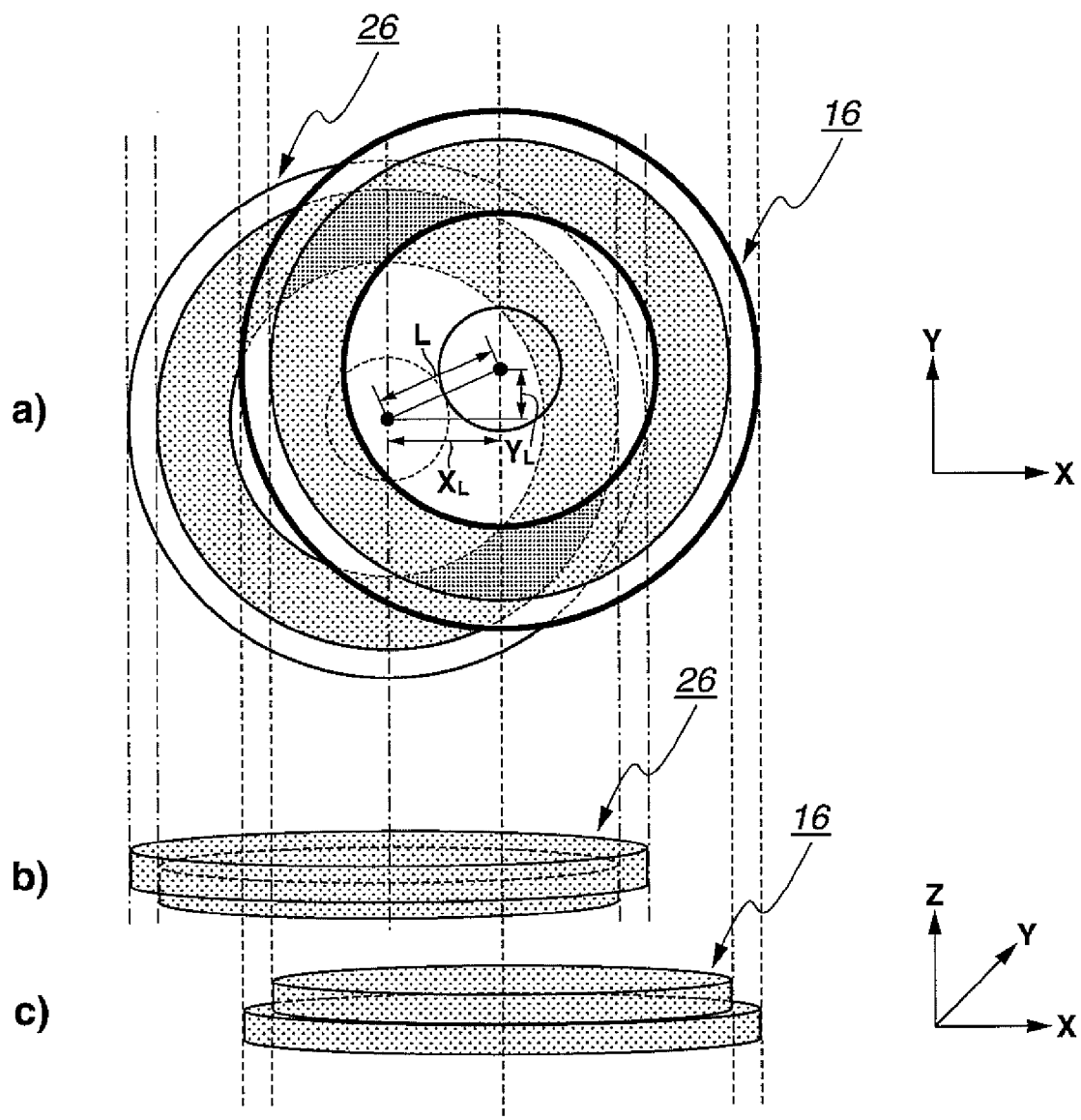
FIG. 2b is a plan view and a perspective view, each view representing that the primary and secondary windings shown in FIG. 1 are opposed to each other and deviated toward X axis direction.

Next, using FIGS. 2a and 2b, a relationship between a positional deviation between a position of power transmitting coil 16 and the position of power receiving coil 26 and a power supply efficiency in the contactless charging system in this embodiment will be described below. Plan views of a) of FIGS. 2a and 2b and perspective views of b) and c) of FIGS. 2a and 2b represent a state in which power transmitting coils 16 and power receiving coils 26 are opposed to each other. In FIGS. 2a and 2b, X axis and Y axis denote a plane direction of each of power transmitting coil 16 and power receiving coil 26 and Z axis denotes a height direction.

In the contactless charging system in this embodiment, power transmission and power reception of a high frequency electric power are carried out in the contactless manner according to an electromagnetic induction action between power transmitting coil 16 and power receiving coil 26. In other words, when a voltage is applied to power transmitting coil 16, a magnetic coupling between power transmitting coil 16 and power receiving coil 26 is generated and the electric power is supplied from power transmitting coil 16 to power receiving coil 26. In such a contactless charging as described above, an efficiency (power supply efficiency) of a power supply from power transmitting coil 16 to power receiving coil 26 is dependent upon a coupling coefficient between power receiving coil 16 and power transmitting coil 26.

Suppose now that, as shown in FIG. 2a, vehicle 200 is parked at the parking space so that power receiving coil 26 is made coincident with power transmitting coil 16 in X axis direction and Y axis direction which are a plane direction. In this case, a relative position between power receiving coil 26 and power transmitting coil 16 is the same position in the plane direction and a distance between power receiving coil 26 and power transmitting coil 16 is a shortest. In this case, since the distance between power receiving coil 26 and power transmitting coil 16 becomes short and the coupling coefficient becomes a highest, the efficiency of power supply becomes high.

On the other hand, as shown in FIG. 2b, in a case where the relative position between power receiving coil 26 and power transmitting coil 16 is deviated in the plane direction as shown in FIG. 2b due to a skill of a vehicle driver, vehicle 200 is sometimes parked in the deviated state in the plane direction.

In an example shown in FIG. 2b, the position of power receiving coil 26 to the position of power transmitting coil 16 is shifted by $X_L$ in X axis direction and is shifted by $Y_L$ in Y axis direction and distance between power transmitting coil 16 and power receiving coil 26 so that the distance between power transmitting coil 16 and power receiving coil 26 in the plane direction indicates L. In this case, the position of power receiving coil 26 is deviated from the position of power transmitting coil 16 by distance L so that the coupling coefficient in this case becomes smaller than the coupling coefficient in the case of FIG. 2a). Consequently, the power supply efficiency becomes lower.

That is to say, in the contactless charging system in this preferred embodiment, it is important in terms of the power supply efficiency that, when vehicle 200 is parked, the positional deviation between power receiving coil 26 and power transmitting coil 16 is made small. Hence, as will be described in details below, when vehicle 200 is parked, the torque control apparatus which facilitates the positioning between power receiving coil 26 and power transmitting coil 16 is mounted in vehicle 200.

Figure 3:
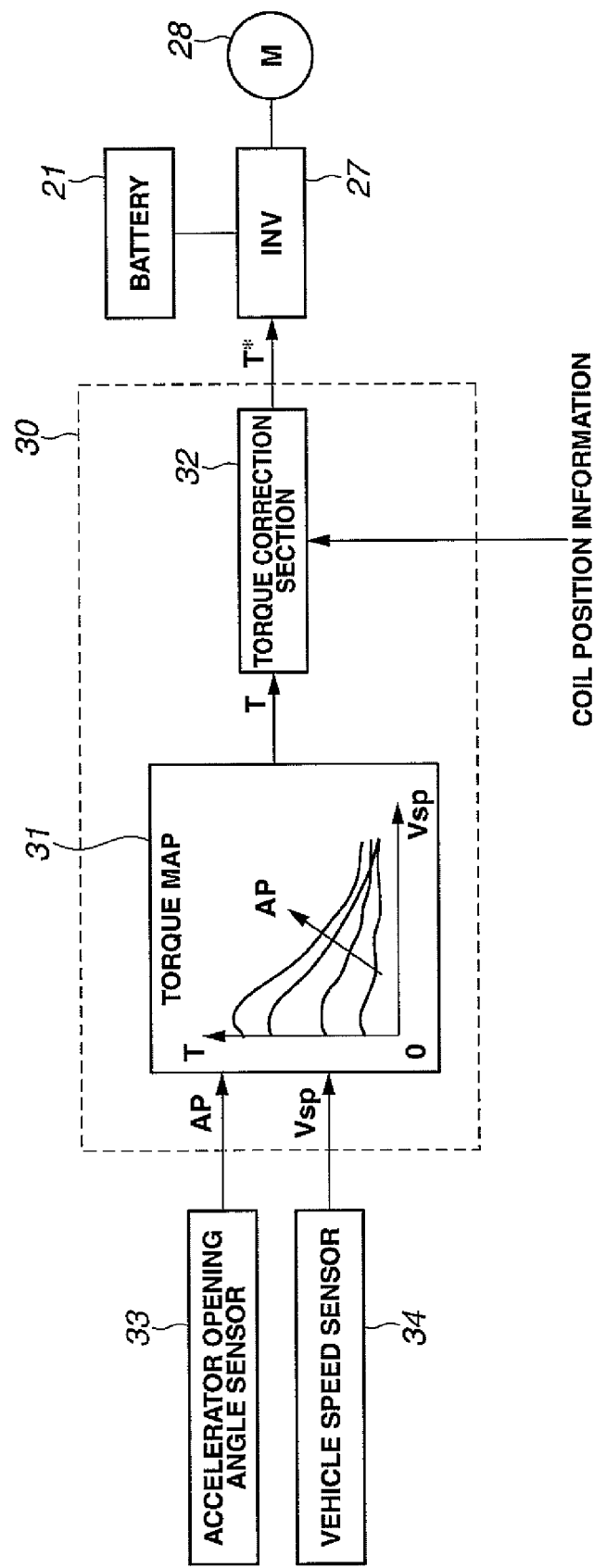
FIG. 3 is a block diagram of a torque control apparatus included in a vehicle in which the contactless charging system shown in FIG. 1 is mounted.
Figure 4:
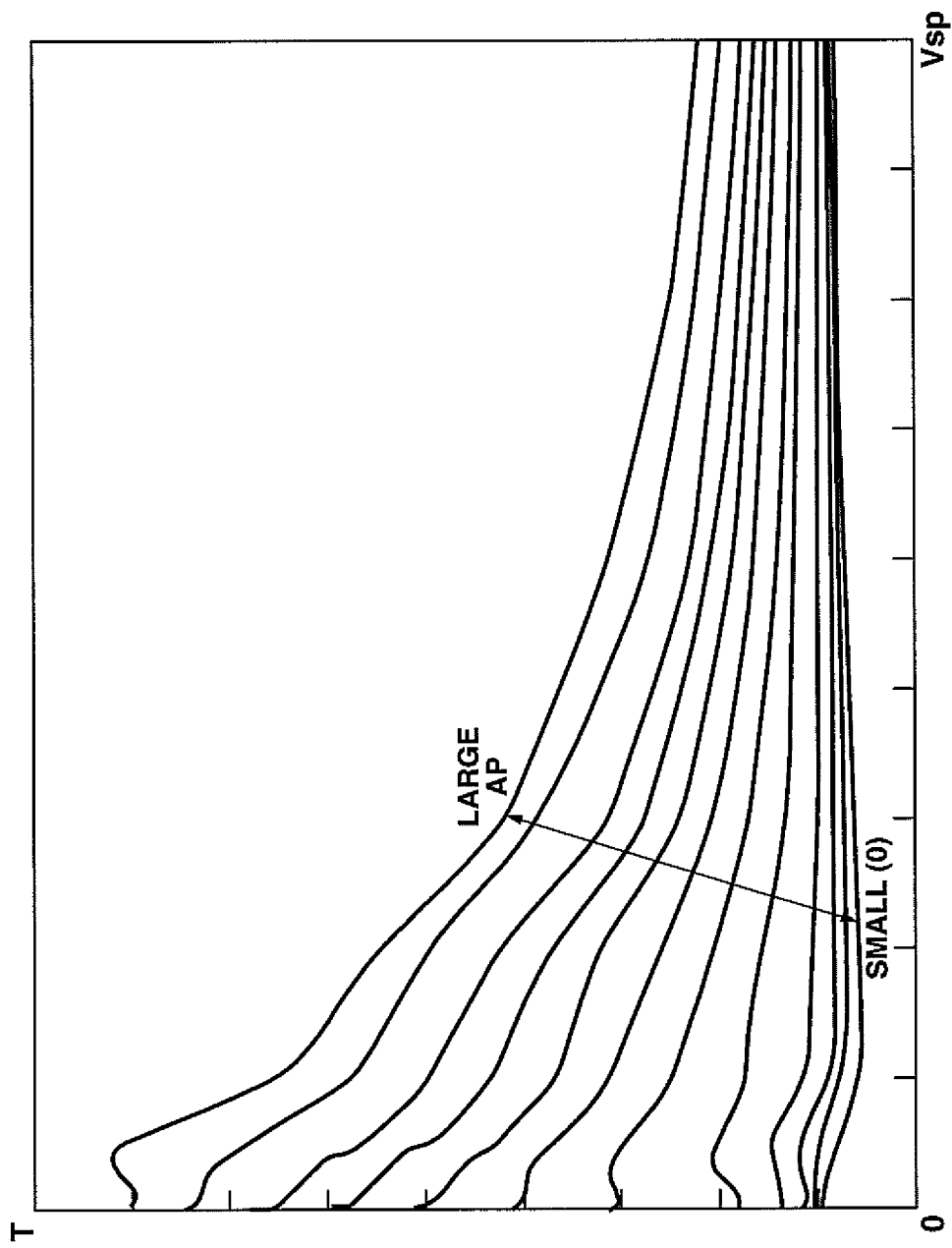
FIG. 4 is a torque map of the torque control apparatus shown in FIG. 3 and is a graph representing a characteristic of a torque (T) with respect to a vehicle speed ($V_{SP}$).
Figure 5:
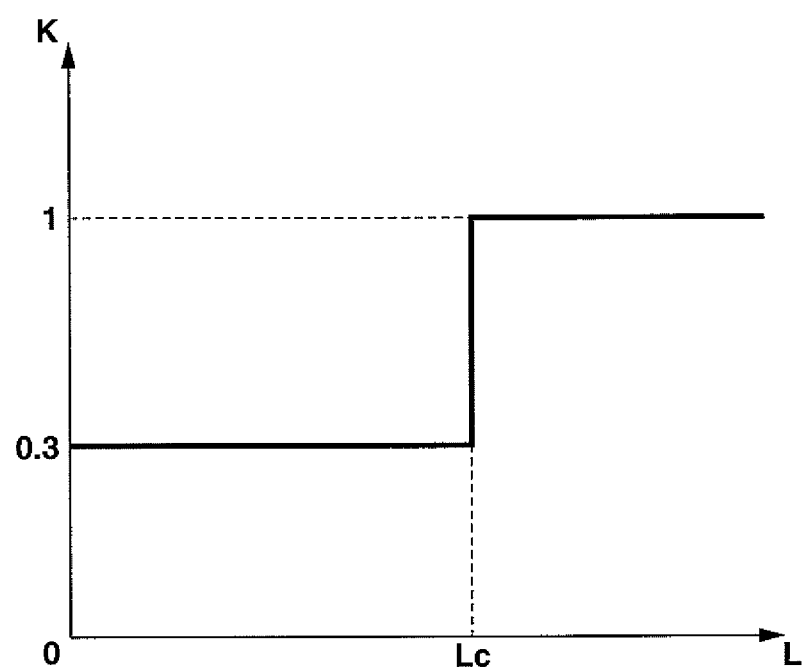
FIG. 5 is a graph representing a characteristic of a correction coefficient (K) with respect to a distance (L) between a power receiving coil and a power transmitting coil in a torque correction section of the torque control apparatus shown in FIG. 3.

Next, the torque control apparatus in this embodiment will be explained with reference to FIGS. 3 to 5. FIG. 3 shows a block diagram of the torque control apparatus in this embodiment. FIG. 4 shows a torque map 31 representing a characteristic of torque (T) with respect to a vehicle speed ($V_{SP}$). FIG. 5 shows a characteristic of a correction coefficient (K) with respect to distance (L) between power receiving coil 26 and power transmitting coil 16.

As shown in FIG. 3, the torque control apparatus includes: a torque map 31; a torque correction section 32; an accelerator opening angle sensor 33; a vehicle speed sensor 34; a battery 21; an inverter 27; and a motor 28. Accelerator opening angle sensor 33 is a sensor to detect an accelerator opening angle (AP) operated by the vehicle driver. Vehicle speed sensor 34 is a sensor to detect a traveling speed ($V_{SP}$) of vehicle 200.

Torque map 31 and torque correction section 32 are parts of EV controller 30 and set a torque command value (T*) for inverter 27 on a basis of accelerator opening angle (AP) and vehicle speed ($V_{SP}$). Torque map 31 is a map previously stored as a map representing a relationship among accelerator opening angle (AP), vehicle speed ($V_{SP}$), and torque (T) as shown in FIG. 4. EV controller 30 refers to accelerator opening angle (AP) detected by accelerator opening angle sensor 33, vehicle speed ($V_{SP}$) detected by vehicle speed sensor 34, and the map described above to set torque (T).

It should be noted that, in FIG. 4, a torque characteristic when accelerator opening angle (AP) is smallest indicates a creep torque characteristic.

Torque correction section 32 corrects torque (T) in accordance with the relative position between power transmitting coil 16 and power receiving coil 26. The relative position between power transmitting coil 16 and power receiving coil 26 is detected at the vehicle side 200 by transmitting the position information of power receiving coil 26 detected by position detection section 14 to EV controller 30 via communication section 15 and communication section 25. Correction coefficient (A) of the torque is a preset coefficient. As shown in FIG. 5, correction coefficient (A) is determined in accordance with distance (L) between power receiving coil 26 and power transmitting coil 16 in the plane direction. In a case where distance (L) between power receiving coil 26 and power transmitting coil 16 is longer than a preset distance (Lc), correction coefficient (K) is set to 1.0. In a case where distance (L) between power receiving coil 26 and power transmitting coil 16 is equal to or shorter than preset distance (Lc), correction coefficient (K) is set to 0.3.

Then, torque correction section 32 corrects the torque by multiplying torque (T) by correction coefficient (K). That is to say, torque correction section 32 does not correct torque (T) in a case where distance (L) between power receiving coil 26 and power transmitting coil 16 is longer than distance (Lc) but corrects torque (T) in a case where distance (L) between power receiving coil 26 and power transmitting coil 16 is equal to or shorter than preset distance (Lc).

Then, EV controller 30 inputs an output torque from torque correction section 32 to inverter 27 as a torque command value (T*). Inverter 27 controls motor 28 so as to make the torque of motor 28 coincident with the torque command value inputted from EV controller 30.

Next, using FIG. 1 and FIGS. 3 to 5, contents of control of the torque control apparatus in this embodiment will be described below.

First, when vehicle 200 approaches the predetermined parking position, EV controller 30 controls communication section 25 to transmit the signal to the effect that the vehicle is parked to perform the charging to charging apparatus 100. When the above-described signal is received through communication section 15, charging control section 13 recognizes that vehicle 200 is approaching the predetermined parking position in order to perform the charging and activates position detection section 14 to detect periodically the position of power receiving coil 26. Charging control section 23 transmits the positional information of power receiving coil 26 detected by position detection section 14 to vehicle side 200 through communication section 15.

EV controller 30 detects the relative position of power receiving coil 26 with respect to the installation position of power transmitting coil 16 from the positional information of power receiving coil 26 transmitted through communication section 15. The positional information is periodically transmitted. Thus, EV controller 30 can recognize to what degree power receiving coil 26 and power transmitting coil 16 approach each other. Then, EV controller 30 calculates a distance (L) between power receiving coil 26 and power transmitting coil 16 in the plane direction from the positional information on power receiving coil 26.

During the drive of vehicle 200, EV controller 30 refers to the map on torque map 31 from the vehicle speed and the accelerator opening angle to set the torque (T). In a case where distance (L) is larger than distance (Lc), it means that the position of power receiving coil 26 is placed at a position separate from the position of power transmitting coil 16. Hence, torque correction section 32 does not correct torque (T) but this non-corrected torque (T) is set to torque command value (T*). In a case where vehicle 200 further approaches the predetermined parking position and distance (L) becomes equal to or below preset distance (Ls), EV controller 30 determines that the position of power receiving coil 26 has approached the position of power transmitting coil 16 and commands torque correction section 32 to correct the torque (T) such as to provide a torque command value (T*) which is smaller than the torque before the correction.

That is to say, if the accelerator opening angle (AP) is the same as the case where distance (L) is longer than distance (Ls) and as the case where distance (L) is equal to or below distance (Ls), the driving torque of motor 28 becomes smaller in the case where distance (L) is equal to or below distance (Ls). The driving torque of vehicle 200 with respect to a depression quantity of the accelerator becomes small. Hence, an operability of vehicle 200 can be increased and the positioning of power transmitting coil 16 with respect to power receiving coil 26 can be facilitated. In other words, in this embodiment, if power receiving coil 26 approaches power transmitting coil 16 and distance (L) becomes equal to or below preset distance (Ls), an accelerator gain with respect to the depression quantity of the accelerator becomes small and a response characteristic of the accelerator becomes dull. Hence, an operability of vehicle 200 can be increased and the positioning of power transmitting coil 16 to power receiving coil 26 can be facilitated.

In addition, in a case where vehicle 200 is parked at the predetermined parking position utilizing the creep, the driving torque of motor 28 is a torque which is smaller than the torque of the creep in a case where distance (L) is longer than distance (Ls) and which is set to the torque command value (T*), when distance (L) becomes equal to or below distance (Ls).

As described above, when power receiving coil 26 approaches power transmitting coil 16 and distance (L) becomes equal to or below distance (Ls), the driving torque of vehicle 200 with respect to the creep torque becomes small. Hence, the operability of vehicle 200 can be increased so that the positioning of power transmitting coil 16 to power receiving coil 26 can be facilitated.

Figure 6:
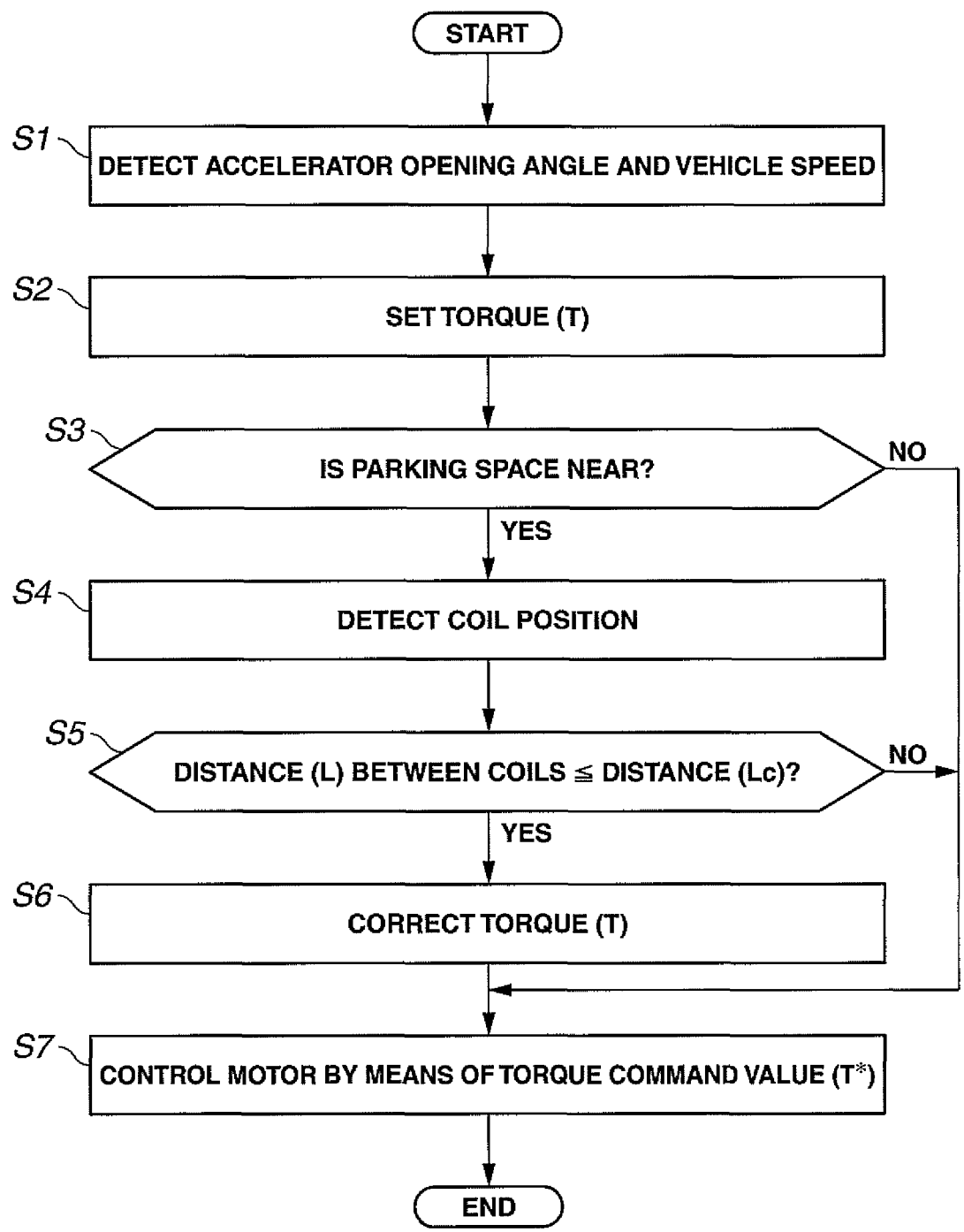
FIG. 6 is a flowchart representing a control procedure of the torque control apparatus shown in FIG. 3.

Next, using FIG. 6, a control procedure of the torque control apparatus in this embodiment will be explained. FIG. 6 shows a flowchart representing a control procedure of the torque control apparatus in this embodiment. Steps shown in FIG. 6 are repeatedly processed at a predetermined period.

At a step S1, EV controller 30 detects the accelerator opening angle (AP) by means of accelerator opening angle sensor 33 and detects the vehicle speed ($V_{SP}$) through vehicle speed sensor 34.

At a step S2, EV controller 30 refers to the map stored in torque map 31 and sets the torque (T) from the detected accelerator opening angle (AP) and vehicle speed ($V_{SP}$).

At a step S3, EV controller 30 determines whether vehicle 200 is approaching the parking space in which the contactless charging system in this embodiment is mounted. This determination may be based on the positional information of vehicle 200 from a GPS function mounted in vehicle 200 and the positional information of the parking space. Or alternatively, this determination may be based on the operation such that vehicle 200 approaches the parking space to make the parking. Then, in a case where EV controller 30 determines that vehicle 200 is approaching the parking space, EV controller 30 transmits the signal indicating that vehicle 200 is approaching the parking space to charging apparatus 100. Charging control section 13 receives the signal from communication section 15 and detects the position of power receiving coil 26 through communication section 15 and transmits the positional information of power receiving coil 26 to vehicle 200 through communication section 15. Then, EV controller 30 receives the signal including the positional information through communication section 25 and detects the relative position between power transmitting coil 16 and power receiving coil 26 (a step S4).

At a step S5, EV controller 30 calculates a distance (L) between power transmitting coil 16 and power receiving coil 26 from the relative position between power transmitting coil 16 and power receiving coil 26 and compares distance (L) with preset distance (Lc). In a case where distance (L) is equal to or below distance (Lc), EV controller 30 corrects torque (T) set at step S2. Specifically, EV controller 30 corrects the torque (T) by multiplying correction coefficient (K=0.3) set in accordance with distance (L) by torque (T) as shown in FIG. 5. Then, EV controller 30 inputs the torque corrected at step S6 to inverter 27 as torque command value (T*), controls motor 28, and drives vehicle 200.

Referring back to step S3, if EV controller 30 determines that vehicle 200 is not approaching the parking space, the routine goes to a step S7 without the position detection of the coils and the torque correction as described at steps S4 through S6.

Then, at step S7, EV controller 30 inputs the torque set at step S2 as torque command value (T*) into inverter 27 to control motor 28 and drive vehicle 200.

Referring back to step S5, in a case where distance (L) is larger than distance (Lc), the routine goes to step S7 without the torque correction at step S6. Then, at step S7, EV controller 30 inputs the torque set at step S2 as the torque command value (T*) into inverter 27 to control motor 28 to drive vehicle 200.

As described above, in this embodiment, in accordance with the relative position between the position of power transmitting coil 16 and the position of power receiving coil 26, the torque (T) set in accordance with the accelerator opening angle is corrected and vehicle 200 is driven according to the corrected torque. Thus, as the position of power receiving coil 26 and the position of power transmitting coil 16 approach, the torque with respect to the accelerator opening angle is corrected so that the driver becomes easy to make the parking. Thus, the positioning between power transmitting coil 16 and power receiving coil 26 can be facilitated.

In addition, in this embodiment, in a case where distance (L) between power transmitting coil 16 and power receiving coil 26 becomes shorter than predetermined distance (Ls), the torque (T) set in accordance with the accelerator opening angle is corrected and vehicle 200 is driven with the corrected torque.

Thus, when the position of power receiving coil 26 and the position of power transmitting coil 16 approach each other, the torque is corrected in order for the response characteristic of the accelerator to become dull. Hence, the accuracy of the parking position becomes high so that a positional deviation between power transmitting coil 16 and power receiving coil 26 becomes small and the positioning between power transmitting coil 16 and power receiving coil 26 can be facilitated.

In addition, in the contactless charging system in this embodiment, during the vehicle drive, the relative position between power transmitting coil 16 and power receiving coil 26 is detected at the earth side, the signal including the information of the detected position is transmitted to vehicle side 200. At vehicle side 200, the torque is corrected in accordance with the relative position included in the signal. After the stop of vehicle 200, the electric power is supplied in the contactless manner from power transmitting coil 16 at the earth side, the electric power is received by means of power receiving oil 26 at vehicle side 200, and the charging to battery 21 mounted in vehicle 200 is carried out. Thus, when the position of power receiving coil 26 and the position of power transmitting coil 16 come near, the torque with respect to the accelerator opening angle is corrected so as to make the driver easy in parking. Hence, the positioning between power transmitting coil 16 and power receiving coil 26 can be facilitated. During the charging after the parking, the positional deviation between power transmitting coil 16 and power receiving coil 26 is small so that the power supply efficiency can be enhanced and a shortening of a charging time can be achieved.

It should be noted that position detection section 14 may photograph power receiving coil 26 of vehicle 200 to analyze a photographed image so that the relative position of power receiving coil 26 to power transmitting coil 16 is detected. In addition, position detection section 14 may detect the relative position between power transmitting coil 16 and power receiving coil 26 from transmission and reception signals of an electric wave between antennae, one of the antennae being a transmitting purpose antenna installed on one of earth side or vehicle side 200 to transmit the electric wave and the other of the antennae being a receiving purpose antenna installed on the other of the earth side or vehicle side 200 to receive the electric wave. In addition, position detection section 14 may detect the relative position between power transmitting coil 16 and power receiving coil 26 by obtaining the positional information on vehicle 200 from a GPS system. Furthermore, position detection section 14 may be installed in vehicle 200 side.

In addition, the torque correction by means of the torque control apparatus in this embodiment includes the torque correction when vehicle 200 is retracted (in a backward direction) not only the torque correction at the time of the forwarding movement of vehicle 200.

In this embodiment, the relative position of power transmitting coil 16 to power receiving coil 26 is detected by means of position detection section 14 in order for the positional deviation between power transmitting coil 16 and power receiving coil 26 to be made small. However, the relative position of the position of vehicle 200 to the predetermined parking position may be detected. That is to say, the position of above-described power transmitting coil 16 corresponds to the predetermined parking position and the position of above-described power receiving coil 26 corresponds to the position of vehicle 200.

The torque control apparatus in this embodiment may not only be mounted in vehicle 200 in which the contactless charging system is equipped but also may be mounted in vehicle 200 in which a parking supporting system for vehicle 200 is equipped. In this case, position detection section 14 may detect the relative position between the predetermined parking position and the position of vehicle 200 and EV controller 30 may correct the torque in accordance with the detected relative position.

In addition, position detection section 14 may be installed in the vehicle side to detect the position of power transmitting coil 16 so that the relative position between power transmitting coil 16 and power receiving coil 26 may be detected.

The torque control apparatus in this embodiment corrects the driving torque of motor 28 when the vehicle is parked. However, in a case where the engine is driven to park the vehicle, the torque of the engine may be corrected in the same way as described above.

The control section including torque map 31 in EV controller 30 corresponds to "torque setting means" according to the present invention. The control section including torque map 31 in EV controller 30 and inverter 27 correspond to "torque control means" according to the present invention. Alternating current power supply 11, converter 12, and charging control section 13 corresponds to "a charger" and position detection section 14 corresponds to "position detecting means".

Figure 7:
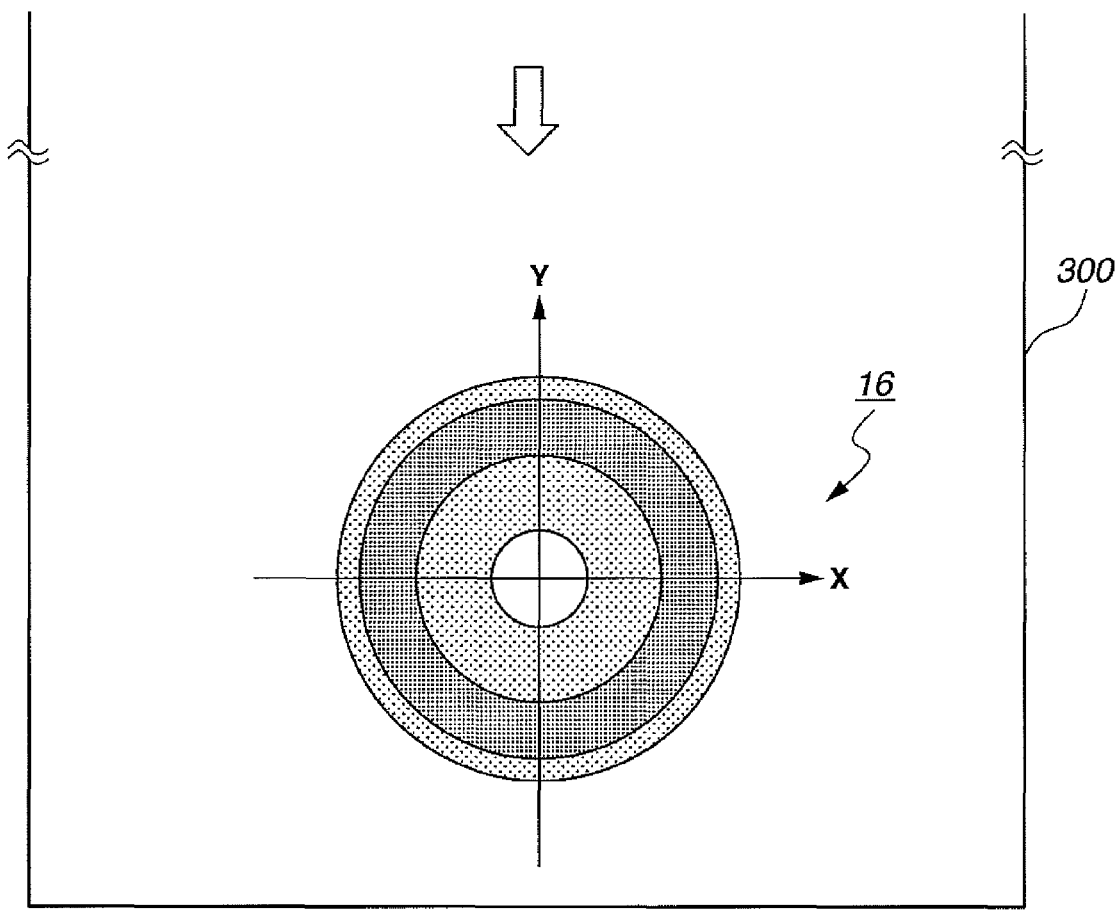
FIG. 7 is an explanatory view of a parking space of a vehicle in the contactless charging system in another preferred embodiment according to the present invention.

FIG. 7 shows an explanatory view of the parking space for vehicle 200 including the torque control apparatus in another preferred embodiment according to the present invention.

In this embodiment, the characteristic of correction coefficient (K) with respect to distance (L) between power receiving coil 26 and power transmitting coil 16 is different from the above-described first embodiment. The other structures are the same as the first embodiment described above. Hence, the description of the other structures in the first embodiment will be applied to this embodiment.

Figure 8:
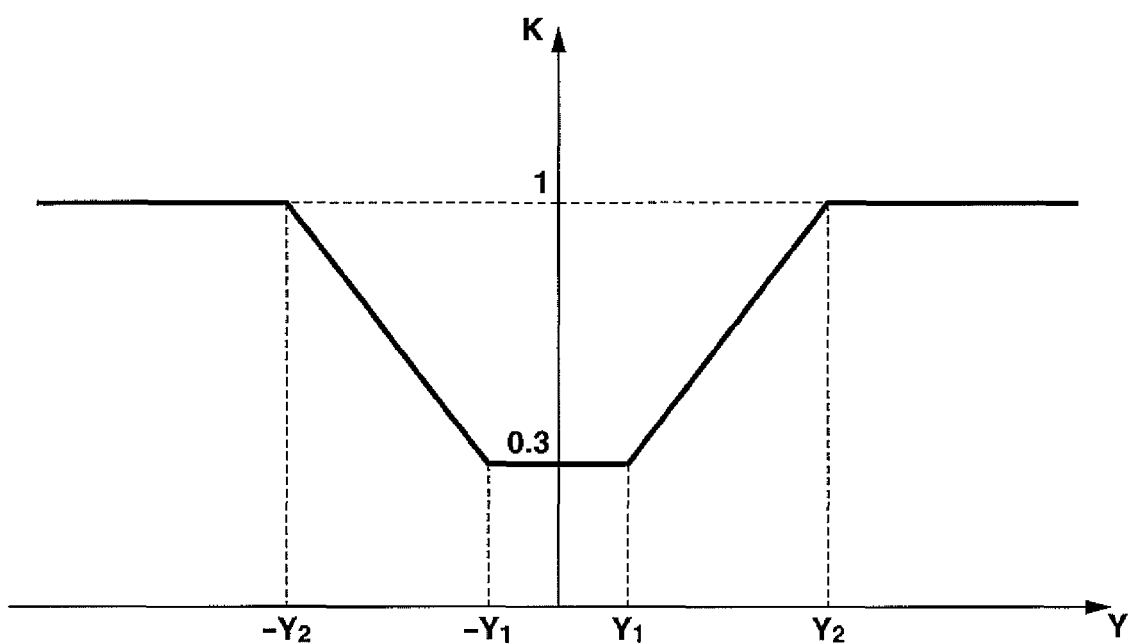
FIG. 8 is a graph representing a characteristic of a correction coefficient (K) with respect to distance (L) between the power receiving coil and the power transmitting coil in a torque correction section of the torque control apparatus in the other preferred embodiment according to the present invention.

Hereinafter, the torque control apparatus in the other preferred embodiment according to the present invention will be explained using FIG. 7 and FIG. 8. FIG. 8 shows a characteristic of correction coefficient (K) with respect to distance (L) between power receiving coil 26 and power transmitting coil 16. As shown in FIG. 7, power transmitting coil 16 is installed on the ground of parking space 300 in which charging apparatus 100 on the earth side is installed. Vehicle 200 in this embodiment is forwarded in an arrow-marked direction shown in FIG. 7 and is parked at the predetermined parking position. It should herein be noted that X axis is taken in a vehicle width direction, Y axis is taken in the forwarding direction of the vehicle at a time of parking of vehicle 200, and an intersecting point between X axis and Y axis is assumed as a center point of power transmitting coil 16. In addition, in a case of a plus or minus sign of Y axis, a distance extended toward a direction of an entrance or exit of parking space 300 (an upper direction of FIG. 7) with respect to a center of power transmitting coil 16 is assumed as a positive direction and the distance extended in an opposite direction to the entrance or exit of parking space 300 (a lower direction of FIG. 7) with respect to the center point of power transmitting coil 16 is assumed as a negative direction.

EV controller 30 calculates distance (L) between power receiving coil 26 and power transmitting coil 16 in the forwarding direction of vehicle 200 with respect to the plane direction of parking space 300 from the positional information transmitted from position detection section 14. Then, EV controller 30 refers to the map in torque map 31 from the vehicle speed and accelerator opening angle, sets torque (T) and corrects the set torque (T) in accordance with distance (L) using correction coefficient (K) through torque correction section 32.

As shown in FIG. 8, in a case where distance between power receiving coil 26 and power transmitting coil 16 is longer than a preset distance ($Y_2$) or in a case where distance (L) is longer than a preset distance ($-Y_2$), correction coefficient (K) is set to 1.0. In addition, in a case where distance (L) is shorter than preset distance ($Y_1$), or in a case where distance (L) is shorter than preset distance ($-Y_1$), correction coefficient (K) is set to 0.3. In addition, in a case where distance (L) between power receiving coil 26 and power transmitting coil 16 is equal to or longer than distance ($Y_1$) but is equal to or shorter than distance ($Y_2$), correction coefficient (K) is increased in proportion to the increase in the distance in a range from 0.3 to 1.0. In a case where distance (L) between power receiving coil 26 and power transmitting coil 16 is equal to or longer than distance ($-Y_1$) but is equal to or shorter than distance ($-Y_2$), correction coefficient (K) is decreased in proportion to a decrease in the distance in the range from 0.3 to 1.0.

Thus, in a case where distance (L) is longer than distance ($Y_2$), EV controller 30 does not correct torque (T) through torque correction section 32 but sets torque (T) as torque command value (T*) since the position of power receiving coil 26 is remote from the position of power transmitting coil 16. When vehicle 200 further approaches the position of power transmitting coil 16 and distance (L) is equal to or shorter than distance ($Y_2$), EV controller 30 corrects the torque (T) such that, as distance (L) becomes shorter, correction coefficient (K) becomes smaller to gradually reduce the torque command value (T*). Furthermore, in a case where the position of power receiving coil 26 approaches the position of power transmitting coil 16 and distance (L) becomes equal to or shorter than distance ($Y_1$), EV controller 30 sets the correction coefficient to a constant value (K=0.3) to correct torque (T).

In addition, the above-described torque control is carried out when vehicle 200 is parked such that power receiving coil 26 exceeds the position of power transmitting coil 16 and vehicle 200 is driven to return the position of power receiving coil 26 to the position of power transmitting coil 16. That is to say, EV controller 30 does not correct torque (T) through torque correction section 32 but assumes the torque (T) as torque command value (T*) since the position of power receiving coil 26 is remarkably remote from the position of power transmitting coil 16 in a case where distance (L) is larger than distance (−Y$_2$). Then, in a case where power receiving coil 26 gradually approaches power transmitting coil 16 and distance (L) is equal to or shorter than distance (−Y$_2$), EV controller 30 corrects the torque (T) in such a way that, as distance (L) becomes shorter, correction coefficient (K) becomes smaller and torque command value (T*) becomes gradually small. Furthermore, the position of power receiving coil 26 approaches the position of power transmitting coil 16 and distance (L) is equal to or shorter than distance (−Y$_1$), EV controller 30 sets the correction coefficient (K) to the constant value (K=0.3) to correct torque (T).

As described above, in this embodiment, as the distance from the position of power transmitting coil 16 and power receiving coil 26 becomes shorter than predetermined distance (Y$_2$ or −Y$_2$) in the forwarding direction of vehicle 200 at the time of parking, the torque is corrected to be made smaller. Hence, as the position of power receiving coil 26 and the position of power transmitting coil 16 approaches each other, the torque is gradually corrected so that a response characteristic of the accelerator becomes dull. Thus, the positional deviation between power transmitting coil 16 and power receiving coil 26 becomes small, an accuracy of the parking position can be increased, and the positioning between power transmitting coil 26 and power receiving coil 16 can be facilitated.

It should be noted that the torque control apparatus in this embodiment calculates a component of the vehicle forwarding direction (Y axis direction in FIG. 7) at the time of parking of vehicle 200 as distance (L), between the position of power receiving coil 26 and power transmitting coil 16, and the above-described torque control is carried out. However, a component in a vehicle width direction of vehicle 200 (X axis direction in FIG. 7) may be calculated as distance (L) and the above-described torque control may be carried out. In addition, EV controller 30 may calculate the distance in the plane direction of the parking space as distance (L) between the position of power receiving coil 26 and the position of power transmitting coil 16 and the above-described torque control may be carried out.

Furthermore, EV controller 30 may calculate distance (L) between power receiving coil 26 and power transmitting coil 16 not only including the component in the plane direction of the parking space but also including a component in a vertical direction with respect to the plane direction of the parking space (a Z direction in FIGS. 2a and 2b) and may carry out the above-described torque control.

In addition, the torque control apparatus, in this embodiment, along with a passage time from a time point at which distance (L) between power transmitting coil 16 and power receiving coil 26 becomes shorter than the predetermined distance, may gradually increase correction coefficient (K) and may correct the torque (T) to be made small. In this embodiment, in a case where vehicle 200 is driven toward the predetermined parking position, the distance between power receiving coil 26 and power transmitting coil 16 becomes short along with the passage of time. Hence, in this embodiment, with the predetermined distance preset as a threshold value, torque (T) is corrected in accordance with the passage time from the time point at which distance (L) becomes shorter than the predetermined distance. Thus, when the position of power receiving coil 26 and the position of power transmitting coil 16 approach each other, the torque is corrected in such a way that the response characteristic of the accelerator becomes dull. Hence, the accuracy of the parking position can be increased so that the positional deviation between power transmitting coil 16 and power receiving coil 26 becomes small and the positioning between power transmitting coil 16 and power receiving coil 26 can be facilitated.

The invention claimed is:

1. A torque control apparatus comprising:
a power receiving coil configured to receive an electric power from a power transmitting coil in a contactless manner by at least a magnetic coupling;
an accelerator opening angle sensor configured to detect an accelerator opening angle; and
a controller configured to
set a torque driving a vehicle on a basis of the accelerator opening angle detected by the accelerator opening angle sensor;
determine whether the vehicle is approaching a parking space;
calculate a distance from the vehicle to the parking space when determining that the vehicle is approaching the parking space;
correct the torque set by the controller such that the driving torque of the vehicle with respect to a depression quantity of the accelerator becomes relatively small, but remains greater than zero; and
drive the vehicle according to the corrected torque, when the calculated distance becomes equal to a predetermined distance such that a position of the vehicle is approaching a predetermined parking position, wherein the predetermined parking position corresponds to the position of the power transmitting coil and the position of the vehicle corresponds to the position of the power receiving coil.

2. A torque control apparatus comprising:
an accelerator opening angle sensor configured to detect an accelerator opening angle; and
a controller configured to
set a torque driving a vehicle on a basis of the accelerator opening angle detected by the accelerator opening angle sensor;
determine whether the vehicle is approaching a parking space;
calculate a distance from the vehicle to the parking space when determining that the vehicle is approaching the parking space;
correct the torque set by the controller such that the driving torque of the vehicle with respect to a depression quantity of the accelerator becomes relatively small, but remains greater than zero; and
drive the vehicle according to the corrected torque, on a basis of an operation to park the vehicle when the vehicle is approaching the parking space.

3. The torque control apparatus as claimed in claim 1, wherein the controller is configured to correct the torque set by the controller in a case where a distance between the power transmitting coil and the position of the power receiving coil becomes shorter than the predetermined distance.

4. The torque control apparatus as claimed in claim 1, wherein the controller is configured to correct the torque set by the controller to become smaller as a distance between the power transmitting coil and the position of the power receiving coil with respect to a forward direction of the vehicle at a time of the parking of the vehicle becomes shorter than the predetermined distance.

5. The torque control apparatus as claimed in claim 1, wherein the controller is configured to correct the torque set by the controller to be made smaller as a distance between the power transmitting coil and the position of the power receiving coil becomes shorter than the predetermined distance.

6. The torque control apparatus as claimed in claim 1, wherein the controller is configured to correct the torque set by the controller to be made smaller along with a passage time from a time point at which the distance between the power transmitting coil and the position of the power receiving coil becomes shorter than the predetermined distance.

7. The torque control apparatus as claimed in claim 1, which further comprises a position detector configured to detect a relative position between the power transmitting coil and the position of the power receiving coil.

8. A contactless charging system which performs a power supply in a contactless manner by at least a magnetic coupling between a power receiving coil installed in a vehicle and a power transmitting coil installed in a charging apparatus at an earth side,
the charging apparatus comprising: a charger configured to supply an electric power to the power transmitting coil; a position detector configured to detect a relative position between the power transmitting coil and the power receiving coil; and a transmitter configured to transmit a signal including the position detected by the position detector, and
the vehicle comprising: a battery charged by the electric power received by the power receiving coil; an accelerator opening angle sensor configured to detect an accelerator opening angle; a controller configured to set the torque driving the vehicle; a receiver configured to receive the signal transmitted from the transmitter; and a torque control detector configured to detect a relative position between a position of the power transmitting coil and the position of the power receiving coil from the signal received by the receiver, the controller configured to correct the torque set by the controller such that the driving torque of the vehicle with respect to a depression quantity of the accelerator becomes relatively small, but remains greater than zero, when a position of the power receiving coil installed in the vehicle is approaching a position of the power transmitting coil, and to drive the vehicle according to the corrected torque when a calculated distance between the vehicle and a parking space becomes equal to a predetermined distance such that a position of the vehicle is approaching a predetermined parking position.

9. A torque control method comprising:
detecting an accelerator opening angle of an accelerator;
setting a torque driving a vehicle on a basis of the accelerator opening angle detected;
determining whether the vehicle is approaching a parking space;
calculating a distance from the vehicle to the parking space when determining that the vehicle is approaching the parking space;
correcting the torque set such that the driving torque of the vehicle with respect to a depression quantity of the accelerator becomes relatively small, but remains greater than zero, and driving the vehicle according to the corrected torque, when the calculated distance becomes equal to a predetermined distance such that a position of the vehicle is approaching a predetermined parking position; and
receiving, via a power receiving coil, an electric power from a power transmitting coil in a contactless manner by at least a magnetic coupling,
wherein the predetermined parking position corresponds to the position of the power transmitting coil and the position of the vehicle corresponds to the position of the power receiving coil.

10. The method as claimed in claim 9, wherein the correcting the torque corrects the torque set to become smaller as a distance between the power transmitting coil position and the position of the power receiving coil with respect to a forward direction of the vehicle at a time of the parking of the vehicle becomes shorter than a predetermined distance.

* * * * *